April 15, 1930.  R. S. GANS  1,754,354
BRAKE CONTROL MECHANISM
Filed July 28, 1926
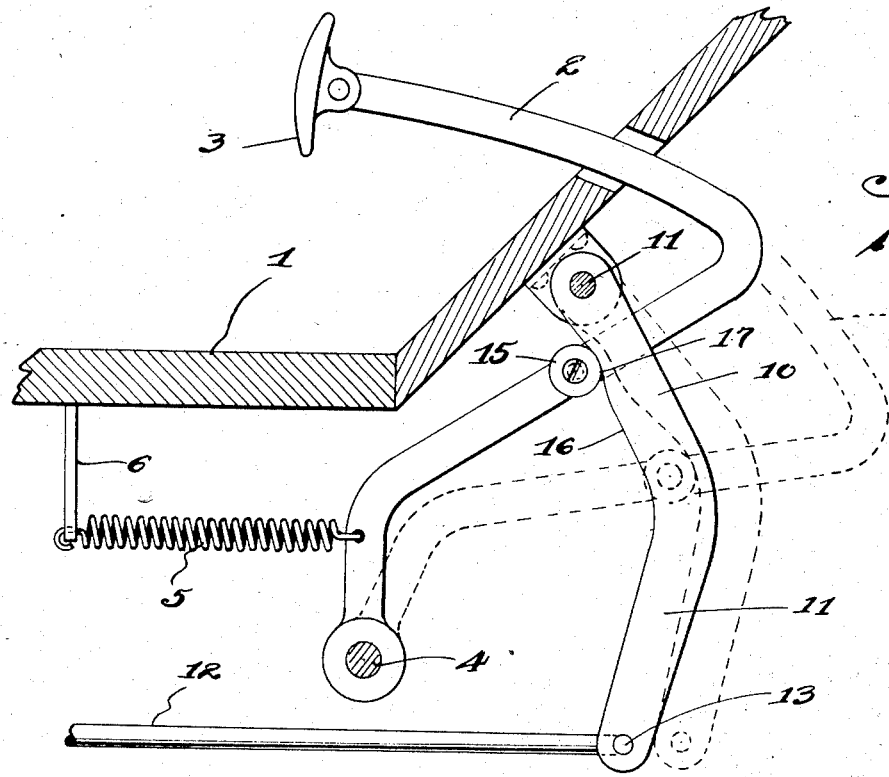
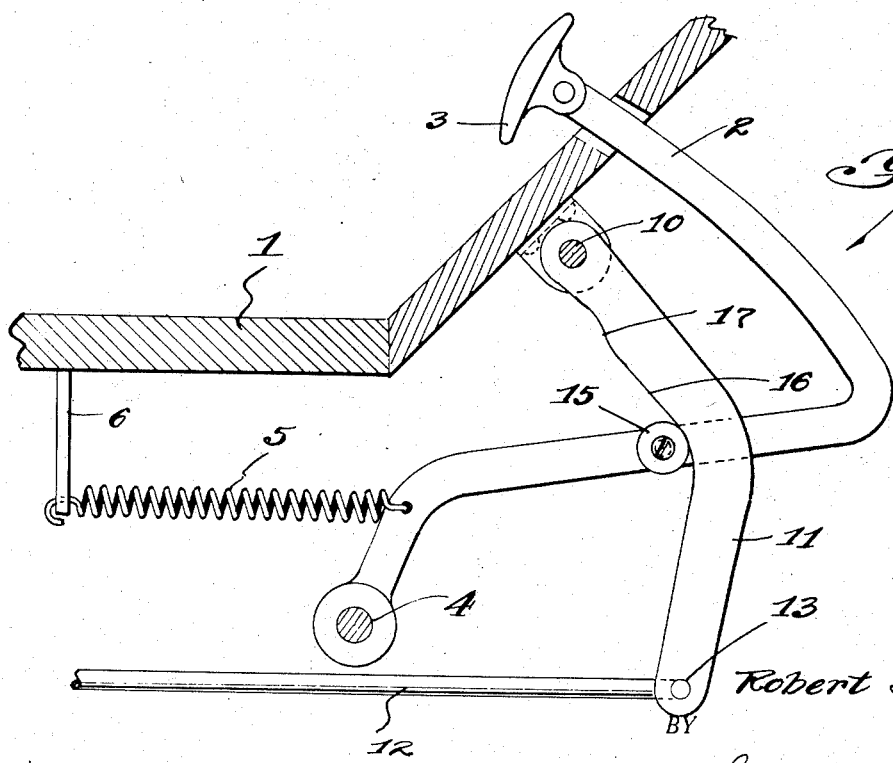
INVENTOR.
Robert S. Gans.
BY
Stuart C. Barnes
ATTORNEY.

Patented Apr. 15, 1930

1,754,354

UNITED STATES PATENT OFFICE

ROBERT S. GANS, OF DETROIT, MICHIGAN

BRAKE-CONTROL MECHANISM

Application filed July 28, 1926. Serial No. 125,379.

This invention relates to control mechanism and has to do particularly with mechanism which is useful for the control of brakes on an automotive vehicle.

It is an object of this invention to provide a control mechanism in which ample pressure can be applied to a draft rod, and brakes, without the requirement of undue amount of applied pressure on the part of an operator.

In an automotive vehicle, the operative movement should not be a large one, that is, it must not travel through a great distance. The invention contemplates a mechanism in which relatively small effort on the part of an operator will apply a large pressure or pull on the draft rod, and this is accomplished without involving a movement on the part of an operator which is out of keeping with the requirements of an automotive vehicle.

According to the invention, the pull on the draft rod is overcome, in the main, by positive connections to rigid and relatively immovable parts of the vehicle. The pull on the draft rod is not directly communicated to the operator, and thus it is not necessary for the operator to overcome the entire draft rod pull. The mechanism is of such a nature that the brake pressure is variable by varying the position of the mechanism parts, and this varying of the position of the parts is accomplished by the operator with a minimum of exertion.

A control mechanism constructed in accordance with the invention is shown in the accompanying drawings which are somewhat diagrammatical and wherein:

Fig. 1 is a view of a foot lever of an automobile for operating the brakes showing, in full lines the "off" position, and in dotted lines the "on" position.

Fig. 2 is a view similar to Fig. 1 showing the parts in "on" position.

Referring to the drawings, the floor boards of an automobile are shown at 1, and a control lever 2, which is operable by the foot of the operator, extends through the floor boards. The lever 2 is provided with a pedal 3, and the lever is pivoted, as at 4, to a rigid part of the automobile, such as the frame.

The pedal normally assumes the position shown in the full lines in Fig. 1, which is the "off" position of the brakes. For this purpose a coil spring 5 may be provided, and this coil spring has one end connected to the lever and another end secured to a stationary part 6. A member 10, in the nature of a link, is pivotally mounted to a stationary part of the automobile, such as the frame or a portion of the engine. The end of the member 10, opposite the point where it is pivoted, is connected to a draft rod 12, which extends to the brakes of the automobile.

The member 10 is designed to rock upon its pivot 11 in order to apply or release the brakes. For this purpose the lever 2 is provided with a roller 15 which contacts with the member 10, and which rolls over the surface 16 of the member. It will be observed that the member 10 intersects the arc of movement of the roller 15 and that when the pedal 2 is pushed by an operator, the roller moves along the member 10 and rocks it about its pivot so as to apply the brakes of the vehicle. The surface with which the roller contacts may be made relatively abrupt, as shown at 17. This is for the purpose of causing a relatively large initial movement of the member 10 in order to take up slack or play in the brakes.

The action obtained by the mechanism is similar to that of the inclined plane. The roller 15 is caused to move along the inclined surface 16 so as to rock the member 10 about its pivot. When the brakes are applied, the pull on the draft rod is taken up by the frame of the automobile through the connections 4 and 11. The pull exerted by the draft rod upon the member 10 causes this member to act in the nature of a lever tending to fulcrum around the roller 15. The strain upon the member 15 is communicated to the frame through the connection 4, and movement of the member 10 is prevented by its connection to the frame at 11. Owing to the fact that the angle between the arc of movement of the roller 15, and the surface 16 of the pivoted member 10, is relatively small, a very small proportion of the pull of the draft rod is communicated through the lever 2 to the foot of the operator.

For the purpose of illustration, the invention has been shown and described in connection with a foot lever of an automobile. It will be understood, however, that the brake control mechanism may be applied as well to a hand operated lever and may be utilized for the control of mechanism other than brakes. In some instances it may be desirable to not use a roller, as any other type of sliding connection may be used. Also, it may be desirable to make the lever of bifurcated construction so that a roller or stud may be securely fastened between the bifurcated parts of the lever.

I claim:

1. A control device for brakes, or the like, comprising a lever, a pivoted link having a cam surface, brake means connected to the link, engaging means on the lever for slidably engaging the cam surface so that movement of the lever rocks the link and actuates the brake means, the said lever and link being positioned and coordinated so that a line drawn through the fulcrum point of the lever, the point of engagement with the cam surface and the pivotal point of the link forms an angle which progressively changes and approaches a right angle as the brakes are applied with the line drawn through the fulcrum point of the lever and said engaging means progressively approaching parallelism with the line of pull by the brake means whereby the brake tension is overcome in the main by the fulcrum point of the lever and pivot point of the link.

2. A control device for brakes, or the like, comprising a lever, a pivoted link having a cam surface, brake means connected to the link, engaging means on the lever for slidably engaging the cam surface so that movement of the lever rocks the link and actuates the brake means, the said lever and link being positioned and coordinated with respect to their pivotal points so that a line drawn through the fulcrum point of the lever, the point of engagement with the cam surface and the pivotal point of the link form an angle which progressively changes and approaches a right angle as the brakes are applied with the line drawn through the fulcrum point of the lever and said engaging means progressively approaching parallelism with the line of pull by the brake means whereby the braking tension is overcome in the main by the fulcrum point of the lever and the pivot point of the link.

3. A control device for brakes, or the like, comprising a lever, a pivoted link having a cam surface, brake means connected to the link, engaging means on the lever for slidably engaging the cam surface so that movement of the lever rocks the link and actuates the brake means, the said cam surface being disposed at a relatively abrupt angle to the adjacent portion of the lever, and the lever and link being coordinated so that as the link is rocked on its pivot point and the brakes applied the angle progressively increases in abruptness with the line drawn through the fulcrum point of the lever and said engaging means progressively approaching parallelism with the line of pull by the brake means whereby as the brake tension progressively increases such tension is overcome in a progressively increasing degree by the fulcrum point of the lever and the pivot point of the link.

4. A control device for brakes, or the like, comprising a lever, a pivoted link having a cam surface which intersects the lever at a point removed from its fulcrum point, brake means operably connected to the said link, and engaging means on the lever for slidably engaging said cam surface so that upon movement of the lever the link is rocked about its pivot to actuate said brake means, the said lever and link being coordinated so that the angle at which the cam surface intersects the lever progressively approaches a right angle as the lever and link are rocked to apply the brakes, with the line drawn through the fulcrum point of the lever and said engaging means progressively approaching parallelism with the line of pull by the brake means whereby the increasing brake tension is overcome in a progressively increasing degree by the fulcrum point on the lever.

5. A control device for brakes or the like, comprising a pivoted lever, a link bent midway of its length and pivoted at one end, said link being disposed to intersect the lever, brake means connected to the link, engaging means on the lever for engagement with the bent link at the point of intersection, said engaging means moving in an arc upon lever actuation, the engaged surface of the link on one side of the bend intersecting said arc whereby lever actuation rocks the link as the said engaging means moves along the engaged surface of the link, said engaging means being adapted to move substantially into the hollow portion of the bend of the link when the brakes are fully applied, with the angle formed by lines drawn from the fulcrum of the lever through the said engaging means, and a line from said engaging means through the fulcrum of the link forming an angle which more nearly approximates a right angle, when the engaging means is in the said hollow portion of the link, than the angle formed by the said lines when the engaging means is removed from the hollow portion and the brakes are in off position.

In testimony whereof I affix my signature.

ROBERT S. GANS.